(12) United States Patent
Rucha et al.

(10) Patent No.: US 6,637,123 B2
(45) Date of Patent: Oct. 28, 2003

(54) APPARATUS AND METHOD FOR MEASURING A CONTOURED SURFACE

(75) Inventors: Robert J. Rucha, Shelby Township, MI (US); Daniel W. McGillis, Fraser, MI (US); Peter J. Deir, Fraser, MI (US)

(73) Assignee: ABB Inc., New Berlin, WI (US)

( * ) Notice: Subject to any disclaimer, the term of this patent is extended or adjusted under 35 U.S.C. 154(b) by 0 days.

(21) Appl. No.: 10/004,532

(22) Filed: Oct. 23, 2001

(65) Prior Publication Data

US 2003/0074802 A1 Apr. 24, 2003

(51) Int. Cl.$^7$ .................................................. G01B 3/22
(52) U.S. Cl. ........................................ 33/544.5; 33/552
(58) Field of Search ................................. 33/544.5, 542, 33/543, 544, 544.4, 544.6, 556, 557, 560, 549, 551, 552, 555, 600, 605

(56) References Cited

U.S. PATENT DOCUMENTS

| | | | |
|---|---|---|---|
| 2,255,996 A | | 9/1941 | Dodge et al. |
| 2,677,191 A | * | 5/1954 | Smith .......................... 33/501.4 |
| 3,197,879 A | | 8/1965 | Chapman |
| 3,315,367 A | | 4/1967 | Walsh et al. |
| 3,653,612 A | | 4/1972 | Palfreyman |
| 3,742,765 A | | 7/1973 | Arnold |
| 3,808,696 A | | 5/1974 | Possati |
| 3,812,594 A | * | 5/1974 | Lukasczyk ..................... 33/517 |
| 4,000,862 A | | 1/1977 | Datwyler |
| 4,031,632 A | * | 6/1977 | Lendi et al. ................... 33/520 |
| 4,190,961 A | | 3/1980 | James et al. |
| 4,238,887 A | | 12/1980 | McLaughlin |
| 4,339,879 A | * | 7/1982 | Selleri ...................... 33/501.09 |
| 4,355,467 A | | 10/1982 | Albertazzi |
| 4,440,031 A | | 4/1984 | De Fazio |
| 4,447,959 A | | 5/1984 | Watanabe et al. |
| 4,563,824 A | | 1/1986 | Baun |
| 4,653,196 A | | 3/1987 | Moschner et al. |
| 4,784,004 A | | 11/1988 | Ekola |
| 4,800,652 A | | 1/1989 | Ballas et al. |
| 4,872,269 A | * | 10/1989 | Sattmann ...................... 33/542 |
| 4,977,681 A | * | 12/1990 | Jiles ............................ 33/542 |
| 5,379,522 A | * | 1/1995 | Jacobs ........................ 33/542.1 |
| 5,452,521 A | | 9/1995 | Niewmierzycki |

* cited by examiner

Primary Examiner—Diego Gutierrez
Assistant Examiner—Amy R. Cohen
(74) Attorney, Agent, or Firm—Ryan Kromholz & Manion, S.C.

(57) ABSTRACT

A contact gauge for measuring a contoured surface on work piece is presented having a matching contoured profile and multiple sensors inserted in a gauge body. The gauge body uses bores filled with spherical balls. At least one ball from each bore contacts the contoured surface, which causes displacement of the ball. The displacement is transferred to and recorded by the sensor. The layout of the gauge permits multiple sensors to be mounted in a compact gauge housing and the gauge housing, in turn, may connected to a robotic arm for rapid and repeated use as an automated measurement apparatus for a component assembly line.

22 Claims, 6 Drawing Sheets

APPARATUS AND METHOD FOR MEASURING A CONTOURED SURFACE

FIELD OF THE INVENTION

This invention relates to measuring gauges in general. More specifically this invention relates to gauges that are used on automated assembly lines to rapidly determine specified dimensions of an item of interest or work piece.

BACKGROUND OF THE INVENTION

Probing gauges are generally known in the prior art. Multi tipped probes are commonly utilized as a measuring instrument. However, they often require a common stylus and therefore cannot operate independently. Instead, the single stylus is employed to take measurements individually, albeit in a rather rapid serial fashion. Other probes, with separate styli for each point of interest are also known. However, such devices are ill suited to the high volume, high pace and rapid measuring requirements of an automated assembly line with gauging of each part.

Because it is desired in automotive assembly operations to determine precise measurements on various components, rapid data collection on every part that passes a given assembly station is vital. For example, in assembling a vehicle differential assembly to a drive shaft, it is critically important to determine measurements of certain features of the differential and drive shaft so that the appropriate shim set may be inserted in the assembly.

One such desired measurement is the axial center of a curved feature on the differential. Prior art attempts to reliably and rapidly determine this desired measurement on each and every assembly in a given workstation have fallen short of the desired goals. Representative examples of the prior art are now discussed.

Chapman (U.S. Pat. No. 3,197,879) describes a gauge for determining the equator of a spherical cavity using a plurality of balls connected to plunger assemblies. Specifically, three balls are used as contacting elements. The balls are part of a respective plunger assembly, and the balls are positioned in respective recesses in the gauge. Each ball respectively is in communication with a shaft assembly. The shaft assembly resists axial movement and only permits longitudinal displacement. A membrane at the distal port of the shaft assembly is subject to movement as the shaft is displaced due to contact of the ball-contacting element with the spherical cavity of interest. A transducer is used to register the displacement.

Walsh (U.S. Pat. No. 3,315,367) describes an apparatus that is manually positioned over a generally spherical work piece of interest. A contact probe with three contact points that are perpendicular to the longitudinal axis of the apparatus may be advanced to engage the selected surface. The probe is adapted to measure concave and convex surfaces. Each contact point is a ball that is in communication with a spring and a shaft, and ultimately to an electronic signal that is relayed to a processor.

Albertazzi (U.S. Pat. No. 4,355,467) describes a gauge and method for checking the contoured portions of a constant velocity (CV) joint. The center of an equatorial plane is constructed from electronic input collected from twenty-four (24) sensing contacts. The sensing contacts are feelers that are connected to corresponding arms, which are arranged in sets. Each arm-set, in turn, is coupled to a block through two perpendicular flat springs by screws. Ultimately, transducers register the displacement of the feelers when said feelers contact the feature of a given CV joint.

Niewmierzycki (U.S. Pat. No. 5,452,521) describes an apparatus and method for detecting and correcting the eccentricity and angular misalignment of a wafer. Using at least four points measured by a plurality of sensors, a microprocessor accurately determines the position of the wafer while on a robot arm. The wafer is substantially circular and flat. The sensors are located around the wafer's edge so to allow each sensor to instantaneously determine the position of a point on the edge. The sensor requires the wafer to be stationary, but uses non-contacting sensors to determine each position. The microprocessor calculates the center of the wafer and compares its calculations to a reference. The information computed in the microprocessor then triggers the robot to adjust the position of the wafer. Two rotatable shafts correct the eccentricity and angular misalignment in a single movement.

Moschner (U.S. Pat. No. 4,653,196) describes a device for measuring a plurality of offset bores that share a common axis. The device uses a plurality of contact sensors linked to a computer.

Baun (U.S. Pat. No. 4,563,824) describes an apparatus for centering a disk of varying sizes. Three contacting probes push and determine the location of three respective points on the disk. The probes, controlled by a computer, can manipulate the disk in a limited range of motion.

Watanabe (U.S. Pat. No. 4,447,959) describes an apparatus for determining the inner diameter of a bore using two contact probes.

Possati (U.S. Pat. No. 3,808,696) describes a method and apparatus for determining the dimensions of a work piece comprising of two pairs of contact sensors linked to respective transducers and a processing unit.

Although the above-identified prior art is generally successful for determining measurements of spherical or otherwise curvilinear surfaces, they are limited in their ability to rapidly collect data necessary to determine the contour of interest in an environment that demands high-speed acquisition and repeated use.

Therefore, there exists a need for a gauge for use in a high-speed production environment to measure a contoured surface in rapid and repeated fashion. Moreover, it is desirable for such a gauge to be compact in design, simple to operate, repair and replace components, when necessary.

SUMMARY OF THE INVENTION

The present gauge incorporates three contact sensors that use a plurality of balls to transfer radial displacement to a coordinate measurement system. The present invention provides a compact design. The arrangement of contacting probes in a single head that nearly simultaneously, but independently, contacts the surface of interest, coupled with sensors, such as digital probes and known calculating means, results in a device that is well suited for accurate measurement of the feature of interest in an automated, high-speed production environment.

A specific embodiment of the present invention is a dynamic probing gauge used in an automated assembly line to verify an origin, also called a center point, of a curved feature such as, a concave semi-circle. In a particular embodiment, the invention measures the origin in two dimensions, that is, an x-coordinate and a y-coordinate. The gauge has a housing that is generally contoured to the mating shape of reference surface of the workpiece, for example a vehicle differential assembly. To define the origin of a circle, a minimum of three probing points are required. Accordingly, an embodiment of the present invention uses three probes positioned on the housing to simultaneously, but independently measure three defining points of a presumed circle.

As a general overview of the specific invention, the following process flow is illustrative of the invention. An automotive differential is loaded on a pallet so that the feature of interest is at the top. The pallet enters the shim selection station, which is fully automated. The differential is unloaded from the pallet and the station then verifies the dimension of interest by lowering the probe with its three contact points into the feature, which is a concave semi-circular opening. When each probe point makes positive contact with the surface of the concave semi-circle, a signal is sent to a central processor. The triggering event occurs when the last probe, of the three, makes contact with the opening. At that instant, the probe registers the x and y and z coordinates of each probe tip, and then calculates the diameter of the curved surface. This information is translated into a shim set and communicated to the operator at the following station. The operator then matches the correct shim set to the specific differential.

The housing for the three probes consists of a gauge tip that is generally contoured to match the shape of the feature of the workpiece. In one embodiment, the workpiece is the location of the center or origin of a semi-circular cavity on an automotive differential. The gauge tip is generally semi-circular and has three narrow sensor bores. Each sensor bore has a retaining feature at a distal port (discussed subsequently). The distal port is adjacent to the gauge tip. Opposite the distal port is a proximal port. There are three probe bores. One probe bore is located on a top surface of the gauge, a second and third probe bore are located on a first and second shoulder, respectively.

The sensor bores are each, preferably, adapted to receive a plurality of balls, similar to such balls as used in spherical roller bearings. The balls are retained in the bore at the distal port by the retaining feature, such as a bushing. At the proximal port, the balls are held in compression by biasing means, such as a common helically wound compression spring. The spring is in mechanical contact with the contacting ball, and at its opposite end, the spring rests against a sensor.

The respective sensors are each rigidly mounted to the housing in a bore, with a sensing end portion being received in an enlarged end portion of the bore. Each sensor has a data-transmitting end portion opposite the sensing end portion. The sensor is oriented in the bore so the sensing end portion is in contact with the compression spring. The spring may be inserted in the bore and adapted to receive the sensing end portion of the sensor. The sensor probe is in contact with the uppermost spherical ball. The number of balls is determined by the diameter, the required curvilinear expanse and the length of the bore, for example. The bore may be straight or curved. The series of balls, terminating with an end ball, is in mechanical contact with one end of the biasing spring, and is therefore retained at the end of the bore adjacent to the proximal port. While at an opposite end of the selected bore, adjacent to the distal port, the series of balls is retained by a retaining feature or retaining means which is in mechanical contact with the surface contacting ball. In the preferred embodiment, the retaining means is a bushing.

The retaining means, or feature, permits a portion of the adjacent contacting ball to protrude beyond the surface of the housing. In this manner, as the gauge is brought in contact with the surface of interest, the contacting ball will contact a reference surface on a given workpiece. As the gauge continues to advance toward said surface, the contacting ball is pushed into the bore. This causes a ripple-like effect along the series of balls, resulting in compression of the biasing, helically wound, coil spring. The sensor thereby registers the axial displacement, or compression, of the biasing spring. Once each sensor located in each bore receives a similar signal, the gauge stops advancing and the reference points are recorded. A reference circle is calculated from the curve that connects the three points, and the gauge then retracts.

In like manner, more than three probes may be utilized, thus allowing many surface contours to be measured, such as ellipses, or complex curves, or even nominally flat surfaces. Likewise, other displacement responsive measuring instruments may be utilized other than digital or analog probes.

DETAILED DESCRIPTION

Figure 1:
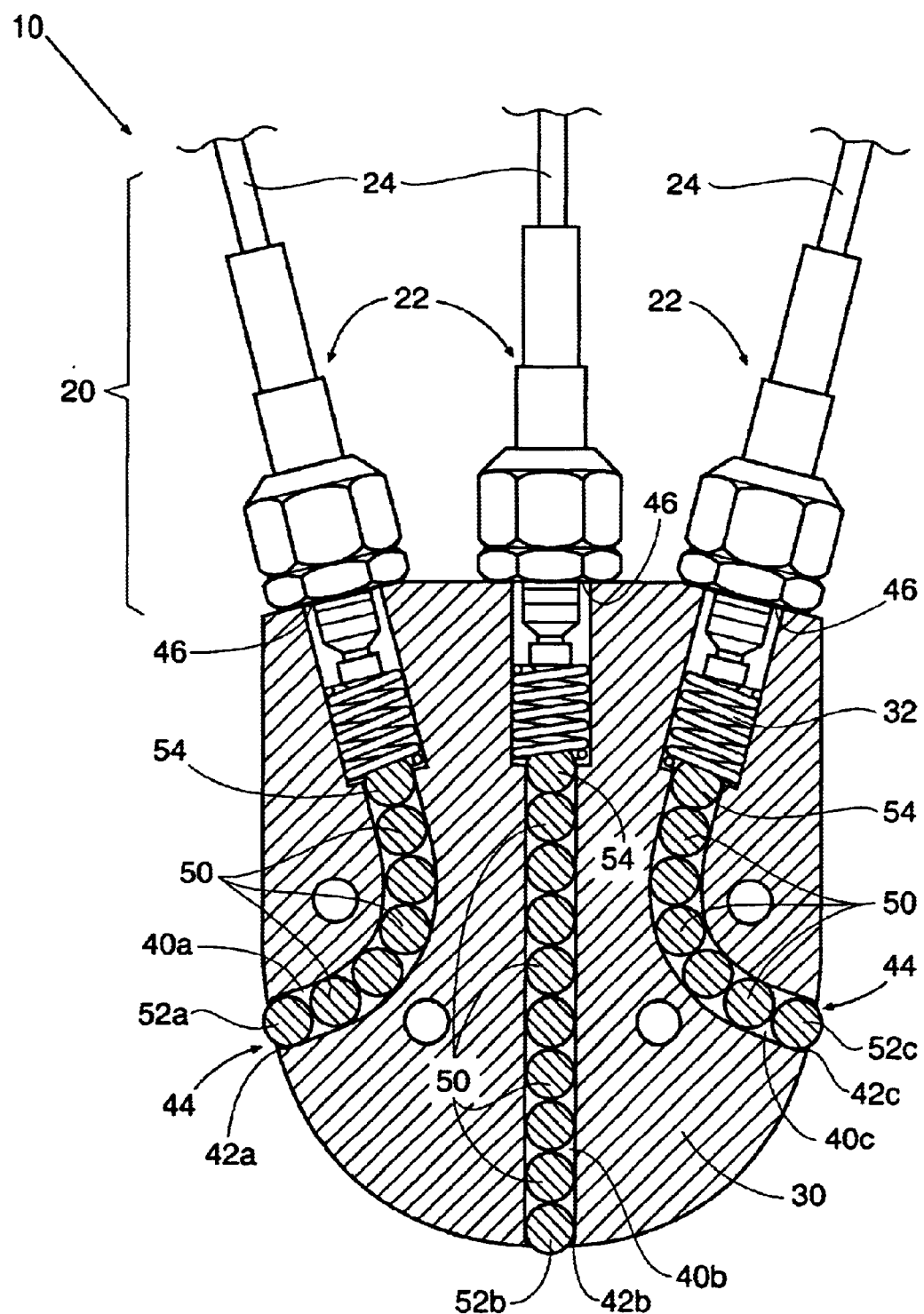
FIG. 1 is a profile view, partially in section, of one embodiment of the present invention showing two curvilinear bores and an intermediate straight bore, each bore containing a series of balls and a respective sensing element.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Similar parts are given similar numbers.

Referring generally to FIGS. 1–6, inclusive, a preferred embodiment of the contour measuring gauge apparatus of the present invention is disclosed and indicated by the general reference numeral 10. The novel gauge apparatus 10 may be used, for example, to determine a reference circle of a contoured surface C of selected workpiece W. (See generally FIGS. 4, 5, and 6). For example, a concave driveline trunnion of a vehicle differential may be the selected workpiece W. As detailed in FIG. 1, the gauge apparatus 10 has, for example, three bores 40a, 40b and 40c. It will be noted that one bore 40b is substantially straight in orientation, while two bores, 40a and 40c, for example, are curvilinear.

Referring specifically to FIG. 1, the bores 40a, 40b and 40c, in a preferred embodiment, may extend inside of a housing 30 and link corresponding, generally oppositely spaced distal and proximal ports 44 and 46, respectively. The proximal port 46 of each of the bores 40a, 40b and 40c holds a sensing device 20, which preferably take the form of digital probes 22 as generally understood in the art (and described subsequently). At the oppositely spaced distal port 44, a respective contour contacting ball 52a, 52b or 52c may preferably protrude from the housing 30 in order to contact with contoured surface C of the workpiece W, as will hereinafter by explained. The contacting balls 52a, 52b and 52c are retained in the respective bores 40a, 40b and 40c by means of internally swaged margins 42a, 42b and 42c. Retained by and contained in each bore 40a, 40b and 40c is at least one intermediate ball or series of contiguously aligned balls 50. The purpose of the balls 50 is explained subsequently herein.

The gauge apparatus 10 of the present invention, may be supported, for example, by an end effector arm A of an automated workstation (not shown) or, in an alternative embodiment, the gauge apparatus 10 may be included in a robotic work cell (not shown). The selected workpiece w is positioned by the workstation and manipulated to be in a position so that the workpiece W will cooperate with the gauge apparatus 10. The workstation may comprise a pallet transfer system, for example, that presents the workpiece W at a known location and orientation.

In a preferred embodiment, the workpiece W may comprise a vehicle differential and the work station may be of an automated variety commonly known in the art of vehicle assembly. The arm A may be connected to a linear slide, or may act as an end effector for a robotic arm. However, what is important is that the support mechanism be able to present the gauge 10 to the workpiece W and withdraw the gauge 10, relative to the position of the workpiece W, after the desired measurement has been retrieved and stored. Therefore, the invention would work equally well wherein the gauge remains fixed in position and the workpiece W is manipulated to contact the gauge 10.

As the gauge 10 makes relative displacement toward the workpiece W, contact between the workpiece W and the gauge 10 will ultimately occur at the contoured surface C with the respective protruding contacting ball 52. A standard type sensor, such as a probe 22 registers the displacement of the contacting ball 52.

The displacement of the contacting ball 52 may be linked to the sensor 22 by a series of balls 50, for example. The series of balls 50 act in concert with the contacting ball 52 to communicate mechanical displacement of the contacting ball 52 when contacting the surface C. The balls 50, 52 are retained in the respective bore 40a, 40b, and 40c by a retaining means 42 at each respective distal port 44. The cooperating series of balls 50 includes an end ball 54 which is in mechanical contact with a biasing means, such as a helically wound compression spring 32. The spring 32 exerts compressive pressure on the series of balls 50, including the end ball 54 and the contacting ball 52, thus creating a reactant force upon the retaining means 42. It will be understood in the art that this configuration of the retaining means 42 and spring 32 is an effective method to retain balls 50, 52 and 54 in each respective bore 40a 40b 40c. Further, it will be understood that as the gauge 10 contacts a contoured surface C on a workpiece W, the contacting ball 52 is displaced inwardly. This inward displacement is transferred through the series of balls 50, causing the spring 32 to compress. This resulting displacement is, in turn, translated into an electrical signal by a conventional sensor 22. The sensor 22, in turn, relays the data to a known calculating device and display means.

Figure 2:
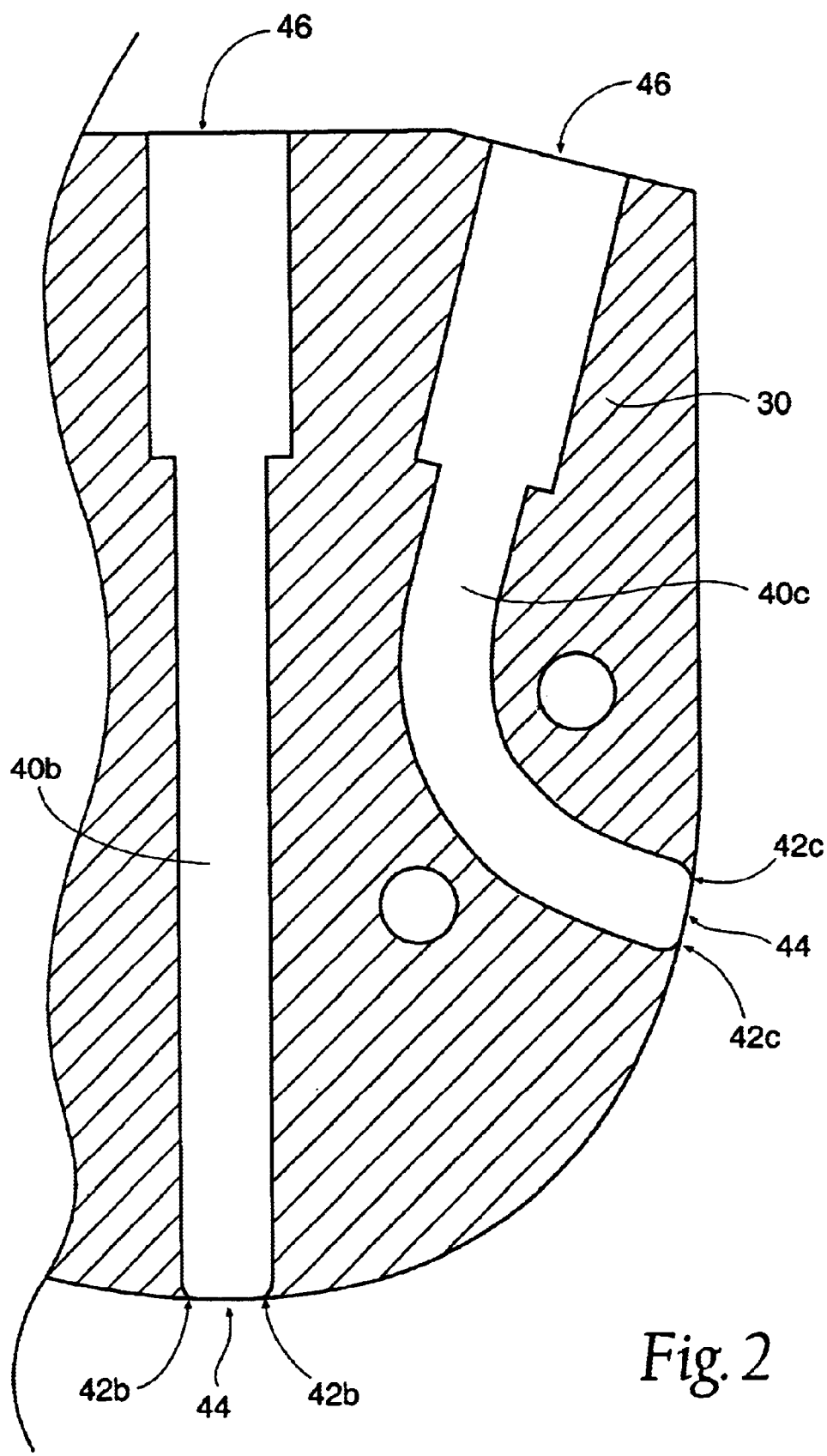
FIG. 2 is a partial detailed cross-sectional view of the housing illustrating details of a retaining feature of the housing according to the teaching of this invention.
Figure 3:
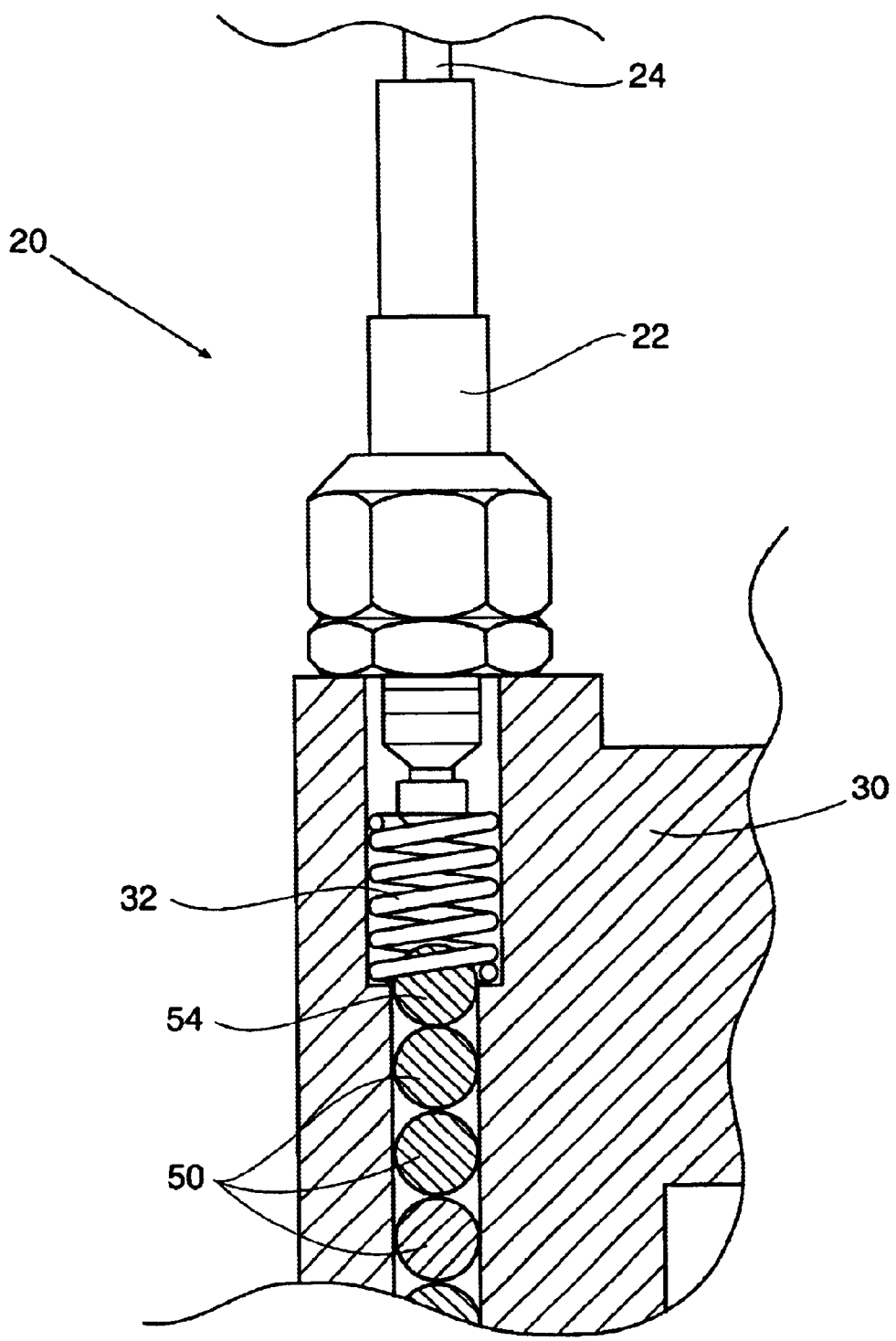
FIG. 3 is a detailed fragmentary cross-sectional view showing a portion of the housing with a sensor and biasing spring residing in a selected bore.
Figure 4:
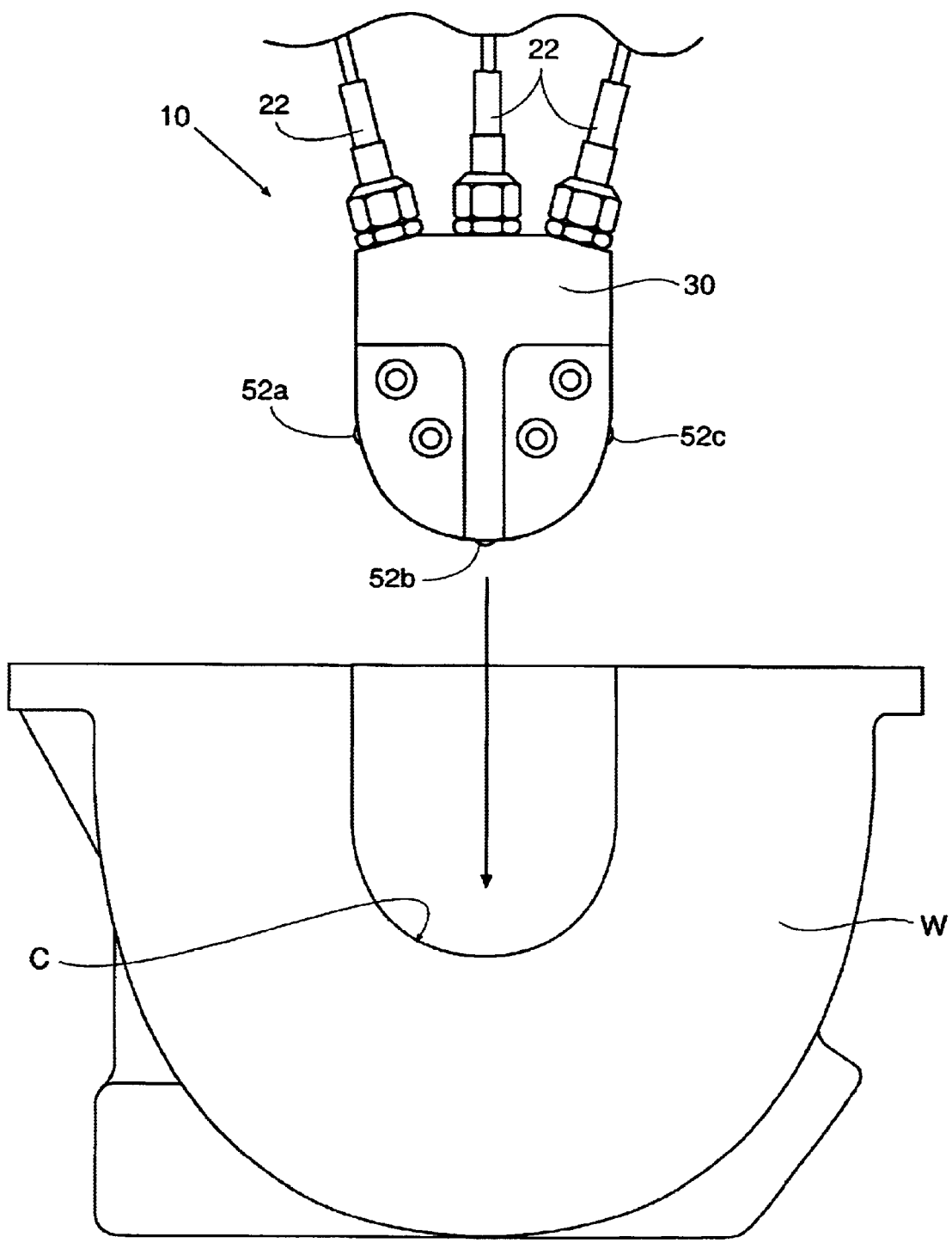
FIG. 4 is an exploded profile view of an embodiment of the invention in relation to a selected workpiece, prior to contacting said workpiece with the gauge of the present invention.
Figure 5:
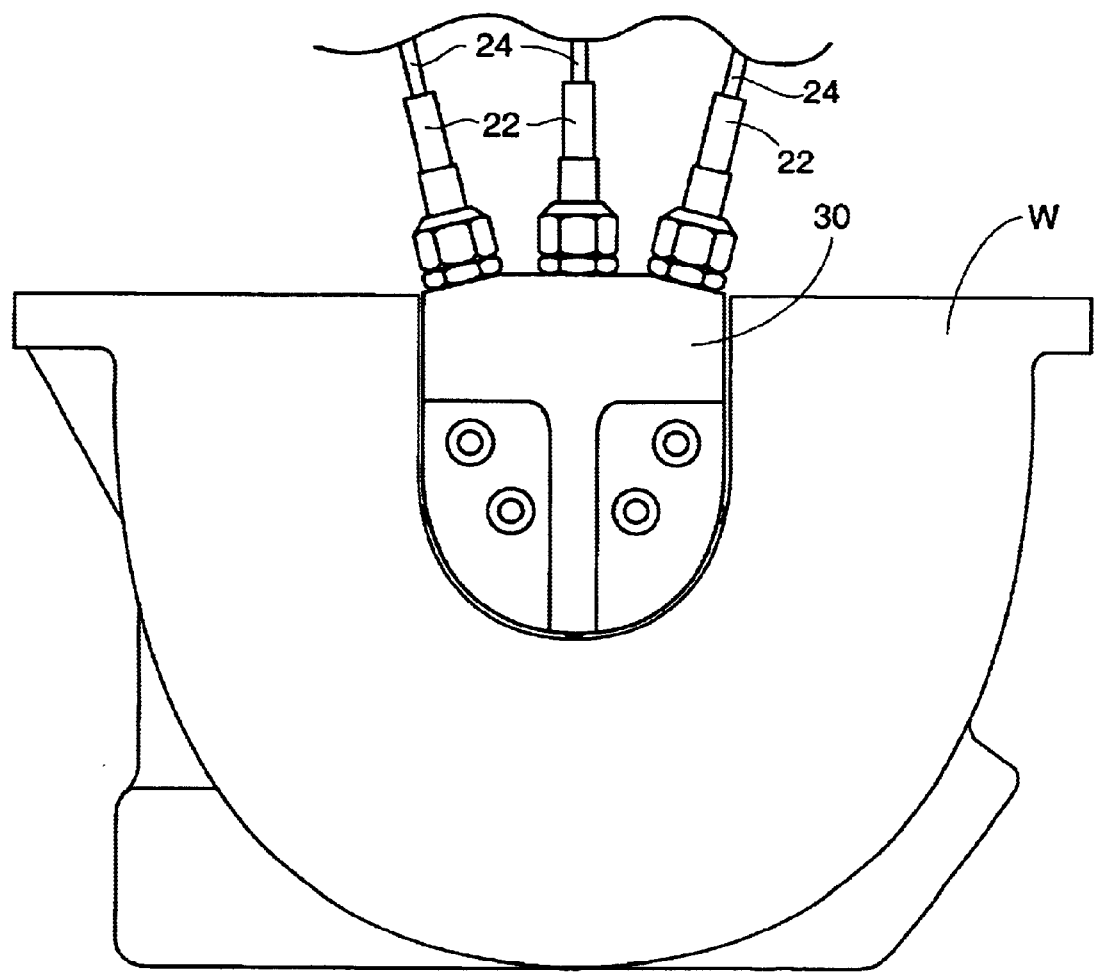
FIG. 5 is a profile view of the invention of FIG. 4 in measuring contact with a selected workpiece.

Referring specifically to FIG. 2, the means for retaining 42 the contacting ball 52, which protrudes outwardly from the housing 30, is shown. The retaining means 42 holds the respective contacting ball 52 inside the bore 40a 40b 40c. As stated previously, this retaining means 42 may be an integral component of the housing 30. The retaining means 42 may include an inward swaged portion of the distal port 44 on each respective bore 40a 40b 40c. Alternatively, such retaining means 42 may be components that are coupled to the housing 30, such as rings (not shown), for example, which could be welded or otherwise coupled or fastened to the housing 30. In a preferred embodiment, the retaining means is a bushing. The retaining means is designed to prevent any ball 50, 52, 54 (not shown in FIG. 2) from escaping the housing 30 at the distal port 44 of a respective bore 40a, 40b, 40c.

Again referring specifically to FIG. 1, the sensing means or sensor 22 comprises a convention probe, such as a digital probe. In a preferred embodiment, the sensor 22 may be a digital probe model no. DP/2/S, manufactured by SOLARTRON Metrology of West Sussex, United Kingdom, or equivalent. While a digital probe is the preferred sensor, it is to be understood that any type of device capable of measuring linear displacement could be utilized in the present invention. The housing 30 is preferably adapted to receive a portion of the sensor 22 as shown. Each bore 40a, 40b, 40c has an enlarged portion adjacent to the proximal port 46, which is sized to receive the sensor 22. The sensor 22 may preferably have lead wires 24 which are arranged to be in electrical communication with a conventional calculating means (not shown). The calculating means may be, for example, a conventional computer or microprocessor, as understood in the art. It may be understood that the housing 30 could contain additional bores beyond the illustrated bores 40a 40b, 40c, thereby increasing the number of sensors that may be included in a given housing. For example, additional sensors may be contemplated in circumstances whereby increased accuracy or more complex contours on a workpiece require measurement. It is contemplated that alternate designs could permit multiple sensors 22, as required to optimize space utilization.

In the present embodiment, a series of balls 50 is used in cooperation with a contacting ball 52 and an end ball 54. In a preferred embodiment, each contacting ball is a 0.2500-inch diameter chrome steel, grade 10 ball. It is to be understood that one ball may be used in lieu of balls 50, 52, 54, as the one ball could perform the same function. Also, a given bore 40a 40b, 40c may be arcuately formed or substantially straight, as desired, without deviating from the invention. It may be understood that such bores would be limited by the size of the housing 30, the number of desired bores and the dimensions of the balls 50 52 54, for example. Arcuate bores would necessarily be limited to arcs that permitted mechanical contact of the single ball or series of balls 50 52 54 in a given bore.

The housing 30 may be constructed of various machined components from material known in the art for use with gauges, such as stainless steel, brass, or aluminum, for example. However, certain polymers or plastics may be used as well. In a preferred embodiment, for instance, the housing 30 is made from hardened tool steel, as is commonly used on such instruments in the art.

Figure 6:
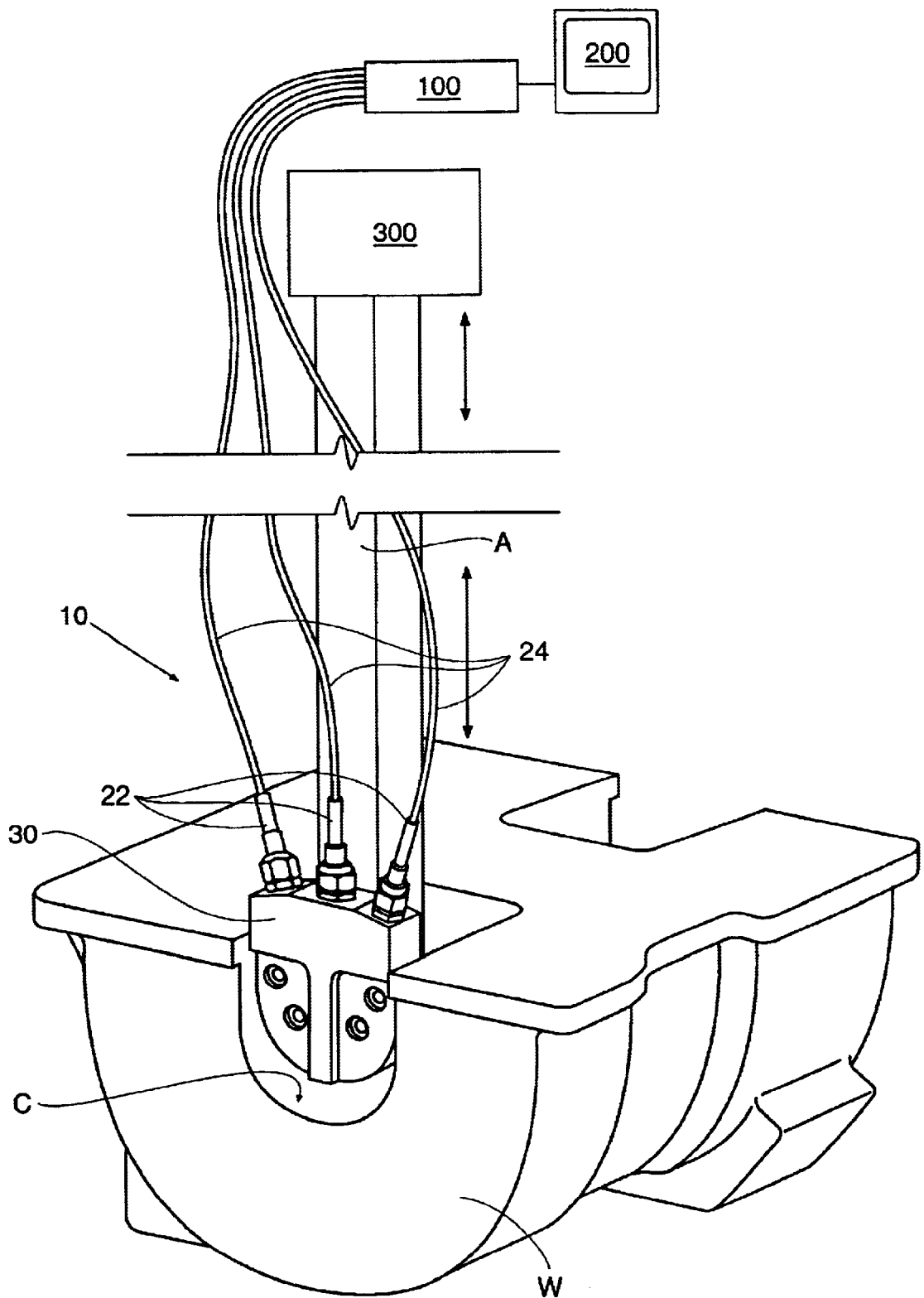
FIG. 6 shows one embodiment of the invention in relation to a workpiece. The embodiment is coupled to a robotic arm at an automated assembly station.

A preferred application of a gauge 10 is illustrated in FIG. 6, showing the dynamic relation of the gauge 10 applied to a workpiece W, such as a vehicle differential having a contoured surface C. The gauge 10 has a profile that corresponds to the contour C. A movable arm A supports the gauge 10. The arm A moves in relation to the workpiece W. Three sensors 22 can be seen inserted in a housing 30. The sensors 22 have lead wires 24 that communicate electrically with a calculating means (not shown).

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for measuring a contoured surface of a workpiece comprising:
    a housing comprising at least one bore;
    said at least one bore being adapted to slideably receive a plurality of contiguously aligned balls, wherein said at least one bore further comprises a proximal port and a distal port, and wherein said series of contiguously aligned balls includes a contour-contacting ball located at the proximal end of said at least one bore and an end ball residing at the distal end of said at least one bore;
    said contour-contacting ball having a portion extending outwardly from said bore at the distal port;
    said housing including at least one sensing element, said sensing element having a sensing end portion residing in the proximal end portion of said at least one bore and having an oppositely spaced data-transmitting end portion;
    said end ball being in mechanical and electrical contact with the sensing end portion of said sensing element;
    biasing means mounted in said at least one bore and being in mechanical and electrical contact with said sensing end portion and with said end ball; and
    said housing further including retaining means arranged to prevent escapement of said contour contacting ball from said at least one bore.

2. An apparatus according to claim 1 wherein said biasing means comprises a helically wound compression spring having a first end and a second end, said first end being in mechanical contact with said sensing element and said second end being in mechanical contact with said at least one ball.

3. An apparatus according to claim 1 wherein said housing comprises a plurality of bores, each of said bores including a proximal port and a distal port, and each of said bores being adapted to slideably receive said plurality of contiguously aligned balls extending between said proximal and said distal ports.

4. An apparatus according to claim 1 wherein the housing is supported by an end effector and an automated workstation, and whereby said automated work station is arranged to dynamically position the housing and its supporting end effector to permit the at least one contour-contacting ball to releasably contact the workpiece.

5. An apparatus according to claim 1 wherein the bore comprises a plurality of balls including a contacting ball which extends outwardly from the distal port and an end ball which is in mechanical contact with the biasing means, said means including a helically wound compression spring, whereby displacement of the contacting ball is mechanically transmitted by the plurality of balls to the end ball to mechanically interact with the compression spring.

6. An apparatus according to claim 1 wherein the sensing element includes a digital probe.

7. An apparatus according to claim 1 further comprising a calculating means in electrical communication with each said sensing element.

8. An apparatus according to claim 7 further comprising a displaying means in electrical communication with the calculating means.

9. An apparatus according to claim 1 wherein said housing includes three bores.

10. An apparatus according to claim 1 wherein the housing includes at least one curvilinear bore.

11. An apparatus according to claim 1 wherein said housing includes two curvilinear bores.

12. An apparatus according to claim 11 wherein the housing further includes a substantially straight bore.

13. An apparatus according to claim 1 wherein the at least one bore further comprises an enlarged portion adjacent to the proximal port.

14. An apparatus according to claim 13 wherein the enlarged portion is adapted to receive a portion of the sensing element.

15. A contoured contact gauge for determining a reference feature for a contoured surface, said gauge comprising:
    a housing comprising a plurality of bores extending from a probe end to an oppositely positioned gauge tip;
    each of said plurality of bores being adapted to receive a sensor and biasing means;
    a plurality of contiguously aligned balls slideably received in each of said plurality of bores and wherein at least one of said contiguously aligned balls is in mechanical contact with the biasing means.

16. The contoured contact gauge of claim 15 wherein the biasing means comprises a helically wound compression spring, said spring comprising a first end and a second end, said first end being adapted to mechanically contact the sensor and said second end being in mechanical contact with said at least one ball.

17. The contoured contact gauge of claim 15 further comprising a calculating means in electrical communication with at least one sensor.

18. The contoured contact gauge of claim 17 further comprising a displaying means in communication with the calculating means whereby the displaying means display the appropriately selected shim set.

19. A contoured contact gauge according to claim 15 wherein the housing includes three bores.

20. A contoured contact gauge according to claim 19 wherein the housing includes at least one bore having an enlarged portion adjacent to the probe end, said enlarged portion being adapted to receive the sensor and the biasing means whereby the sensor is in mechanical contact with the biasing means.

21. A contoured contact gauge according to claim 19 wherein each bore of said plurality of bores further comprises a retaining means located adjacent to the gauge tip; and wherein the plurality of balls further comprises a contacting ball whereby said contacting ball protrudes from the housing at said gauge tip.

22. A contoured contact gauge according to claim 21 wherein the plurality of balls further comprises an end ball, said end ball being in mechanical contact with the biasing means whereby mechanical displacement of the contacting ball is mechanically communicated through the plurality of balls to the end ball.

* * * * *